United States Patent [19]

Haley

[11] Patent Number: 5,078,255
[45] Date of Patent: Jan. 7, 1992

[54] COOKIE CONVEYING SYSTEM WITH DIVERTER

[75] Inventor: Charles T. Haley, Athens, Ga.

[73] Assignee: Food Machinery Sales, Inc., Athens, Ga.

[21] Appl. No.: 640,885

[22] Filed: Jan. 14, 1991

[51] Int. Cl.$^5$ .............................................. B65G 37/00
[52] U.S. Cl. ...................................... 198/358; 198/369
[58] Field of Search ............ 198/358, 369, 592, 861.5, 198/444, 435, 445, 432, 364

[56] References Cited

U.S. PATENT DOCUMENTS

| | | | |
|---|---|---|---|
| 3,565,725 | 2/1971 | Siempelkamp | 198/435 X |
| 3,735,853 | 5/1973 | Lingg et al. | 198/370 |
| 3,972,415 | 8/1976 | Ronde | 198/370 |
| 4,166,525 | 9/1979 | Bruno | 198/437 |
| 4,553,658 | 11/1985 | Gasser | 198/369 |
| 4,555,010 | 11/1985 | Solund | 198/361 |
| 4,848,558 | 7/1989 | Rechsteiner | 198/369 |
| 4,884,677 | 12/1989 | Yu et al. | 198/370 |
| 4,938,336 | 7/1990 | Aquino et al. | 198/444 X |

FOREIGN PATENT DOCUMENTS 2131378  6/1984  United Kingdom ............... 198/369

Primary Examiner—Robert P. Olszewski
Assistant Examiner—Cheryl L. Gastineau
Attorney, Agent, or Firm—Hopkins & Thomas

[57] ABSTRACT

A method and apparatus for diverting lines (19) of cookies (11) being carried on an automated processing line (12) to a standby cookies processing station (18) when the primary processing station (14, 16 or 17) for the cookies (11) has become inoperable. When a primary processing station (14, 16 or 17) breaks down, the vertical diverter conveyors (33, 34 and 36) over which the lines (19) of cookies (11) are moving toward the inoperative primary processing station (14, 16 or 17) are tilted downwardly to divert the cookies (11) from their normal path of movement. A plurality of lateral diverter conveyor system (46) is moved into alignment with the downwardly tilted vertical diverter conveyors (33, 34 and 36). The lateral diverter conveyor system (46) receive the cookies (11) from the downwardly tilted vertical diverter conveyors (33, 34 and 36) and route the cookies (11) toward a standby processing station (18).

13 Claims, 3 Drawing Sheets

COOKIE CONVEYING SYSTEM WITH DIVERTER

FIELD OF THE INVENTION

The present invention relates in general to a method and apparatus for transporting and packing small objects such as cookies, crackers and the like wherein the cookies are moved in multiple rows to packing stations or other processing stations. More particularly, the present invention relates to a method and apparatus for diverting some of the rows of cookies being transported toward a processing station that has become inoperative to a standby processing station so that the processing of the cookies can be continued while the inoperative processing station is repaired.

BACKGROUND OF THE INVENTION

In the automated production of cookies, crackers and similar baked items, typically the cookie dough, etc. is deposited on a wide oven conveyor belt in small, uniform quantities in a regularly spaced array of dough dollops or balls, as by wire cutting the dough as the dough is extruded from a plurality of nozzle openings. Typically the dough balls are arranged in about 21 parallel rows on the oven conveyor belt with the dough balls being staggered in adjacent lines along the length of the oven belt so as to place the maximum number of dough balls on the oven belt for a given length of the belt. The oven belt carries the dough balls through an open ended oven which can be 250 to 300 feet long When the dough balls emerge from the oven, the cooking process is completed Another wide cookie conveyor belt system receives the cookies from the oven conveyor and carries the hot baked cookies beyond the oven through a cooling system to cool the cookies. The cooling conveyor deposits the cookies on individual conveying lines for the separate primary processing stations. The equipment in the processing stations, as for example an enrober or a packaging machine of the type disclosed in U.S. Pat. No. 4,712,356, further process the cookies by coating the cookies with chocolate, or by placing the cookies in a cookie tray, etc. Typically, a primary processing station will handle three lines of cookies on individual narrow parallel conveyor belts. Therefore, several processing stations are required for handling the multiple rows of cookies delivered from the oven.

A problem which frequently arises with such a system is that when a primary processing station for one of the lines of cookies becomes inoperative, a steady stream of cookies is being produced by the oven but not processed. Since a cookie oven typically cooks several lines of cookies, i.e. 15-21 lines of cookies simultaneously, it would not be practical to shut down the oven when only one primary processing station has become inoperative, as this would require shutting down the remaining 12-18 rows of cookies headed for fully operational processing stations.

Also, it is not practical to shut down only the conveying lines leading to the inoperative processing station, as by stopping the depositing of dough on the three rows of cookies leading to the inoperative processing station, because the back-log of cookies in the system travelling through the oven, the cooling conveyor and on the other conveying lines is too large.

In the past, a solution to this problem was to continue running all of the lines of cookies through the oven and to the processing stations. Those cookies which were not processed were then dumped off the conveying lines and typically either thrown away as waste or hand packed or fed by hand through a secondary processing station.

In recent years, systems have been developed for automatically diverting cookies and like products from a conveying line to a standby processing station when a primary processing station for the cookies has become inoperative. Such systems generally have included a means for tilting the three infeed conveyor belts that lead to the inoperable processing station downwardly into alignment with a wide standby conveyor belt. The standby conveyor belt is positioned below and moves typically in the same direction as the direction of movement of the processing line and is generally as wide as the entire processing line. The standby conveyor belt has an angled guide plate which extends diagonally across the direction of movement of the standby conveyor belt. When the cookies are to be diverted from an inoperative processing station, the three adjacent conveyor belts carrying cookies toward the inoperative processing station tilt downwardly into alignment with the standby conveyor belt and the cookies pass onto the standby conveyor belt. As the cookies move with the standby conveyor belt, the angled guide plate sweeps the cookies laterally toward the processing conveyor of the standby processing station.

Such a system works well as long as only a single line of cookies is diverted at a time. However, when multiple lines of cookies are to be diverted, there is a tendency for the cookies being swept laterally by the angled guide plate to become accumulated with no space between them in a random collection which is not compatible with the standby processing station. Thus, the cookies cannot be automatically processed by the standby processing station.

Accordingly, it can be seen that it would be desirable to provide a method and apparatus for diverting multiple lines of cookies being transported on an automated processing line to a standby processing station when the primary processing station for the cookies has broken down and become inoperable and for maintaining the cookies in an orderly arrangement as they are delivered to the standby processing station.

SUMMARY OF THE INVENTION

Briefly described, the present invention comprises a method and apparatus for automatically transporting and processing cookies, crackers and like objects as lines of cookies move in parallel paths from a cookie oven toward a plurality of primary processing stations, including a method and apparatus for diverting several lines of cookies simultaneously in an orderly arrangement to a standby processing station when the primary processing station for the cookies is inoperative. Typically, the lines of cookies are received in a horizontal as-baked attitude or in an overlying shingle-stacked arrangement, resting on the processing conveyors of the cookie conveying lines that transport the cookies in parallel paths toward the primary processing stations. Each primary processing station will accept three lines of cookies, for example.

When one of the primary processing stations for a plurality of lines of cookies malfunctions and becomes inoperative, vertical diverter conveyors over which the lines of cookies which are headed for the inoperative processing station are tilted downwardly, which moves the delivery end of the tilted vertical diverter conveyors out of the normal processing path for the lines of cookies. The tilting of the vertical diverter conveyors diverts the lines of cookies away from their normal paths of movement and away from the inoperative primary processing station. A lateral diverter conveyor system is moved into a receiving position aligned with the downwardly tilted vertical diverter conveyors so as to receive the lines of cookies and transport the lines of cookies toward a standby processing station.

In one embodiment of the invention, the lateral diverter conveyor system comprises a doorstep conveyor system. The doorstep conveyor system includes three doorstep conveyors which are substantially rectilinear conveyor belt systems. Each of the doorstep conveyors is directionally aligned with the movement of the diverted lines of cookies on the downwardly tilted vertical diverter conveyors and extends between the delivery end of one of the downwardly tilted vertical diverter conveyors to a point immediately adjacent the side edges of one of the three standby conveyors for the standby processing station. Each of the doorstep conveyors is oriented so as to deliver its cookies in a path of movement normal to the path of movement of its standby conveyor such that as the cookies pass from the doorstep conveyors to the standby conveyors, the cookies are turned at a 90° angle. The doorstep conveyors receive the diverted lines of cookies and generally maintain the cookies in the same spacing as received from the downwardly tilted vertical diverter conveyors, and route the cookies toward the standby processing station for further processing.

A control means is provided for moving the doorstep conveyors into alignment with the downwardly tilted vertical diverter conveyors. The control means includes a drive motor and a travel screw which is driven by the drive motor and which is attached to the doorstep conveyors. As the vertical diverter conveyors are tilted downwardly into a diverting position, a signal is transmitted to the control means, which activates the drive motor. The activation of the drive motor causes the drive motor to rotate the travel screw. As the travel screw rotates, it moves the doorstep conveyors laterally, so as to align the input end of each of the doorstep conveyors with the delivery end of one of the downwardly tilted vertical diverter conveyors. The lines of cookies being carried on the downwardly tilted vertical diverter conveyors are transferred to the doorstep conveyors and the lines of cookies are turned at a right angle as they pass from the doorstep conveyors to the lateral diverter conveyor system and are moved toward the standby processing stations.

A scrap conveyor is provided beneath the point of transfer of the cookies from the downwardly tilted vertical diverter conveyors onto the lateral diverter conveyor system. As the vertical diverter conveyors are being tilted downwardly or upwardly toward or away from their diverting positions, the cookies, crackers or other objects being transported along the processing lines are moved off of the cookie delivery end of the vertical diverter conveyors and fall onto the scrap conveyor which carries the cookies, crackers or other objects away from the cookie conveying system to a collection area where they can be processed separately by hand.

In another embodiment of the invention which is used for diverting lines of shingle stacked crackers and the like, the lateral diverter conveyor system comprises a 90° live belt. The live belt extends in a 90° arc from the delivery end of the three downwardly tilted vertical diverter conveyors toward the standby processing station. A "header" is provided above the surface of the 90° live belt and includes a series of curved guide rails that are supported above the surface of the 90° live belt and which track the contour of the 90° live belt. The guide rails form three separate paths on the 90° live belt which maintain the separation of the lines of cookies as they are moved about an arcuate path from the downwardly tilted vertical diverter conveyors toward the standby processing station. An expansion conveyor system is attached to the cookie delivery end of the 90° live belt. The expansion conveyor system includes an expansion belt that expands and contracts as the 90° live belt is moved laterally by the control means and functions to provide a smooth transition for the lines of shingle stacked crackers from the 90° live belt onto the standby station conveyor belts. As with the first embodiment of the invention, the diverted lines of cookies are transferred from the downwardly tilted vertical diverter conveyors to the 90° live belt of the lateral diverter conveyor system and to the standby processing station for processing while the inoperable primary processing station is being repaired.

Thus, there is no need to shut down the processing lines for particular lines of cookies when the primary processing station for the lines of cookies is being repaired. As a further consequence, the lines of cookies no longer have to be discarded as waste or manually processed when the primary processing station has become inoperative.

Thus, it is an object of this invention to provide an improved method and apparatus for diverting lines of cookies on an automated baking line to a standby processing station when the primary processing station for the lines of cookies has become inoperative.

Another object of the invention is to provide an improved method and apparatus for diverting lines of cookies on an automated baking line toward a standby processing station when the primary processing station for the lines of cookies has become inoperative, without a substantial risk of the cookies becoming jammed together and blocking the path of movement of the cookies into the standby processing station when more than one line of cookies is being diverted.

Another object of this invention is to provide an improved method and apparatus for diverting multiple lines of cookies moving along an automated baking line to a standby processing station by aligning a lateral diverter conveyor system automatically with the cookie delivery ends of a series of vertical diverter conveyors as the vertical diverter conveyors are pivoted downwardly into a diverting position so as to receive and transport the cookies the standby processing station.

Other objects, features and advantages of the present invention will become apparent upon reading the following specification, when taken in conjunction with the accompanying drawings.

DESCRIPTION OF THE PREFERRED EMBODIMENT

Figure 1:
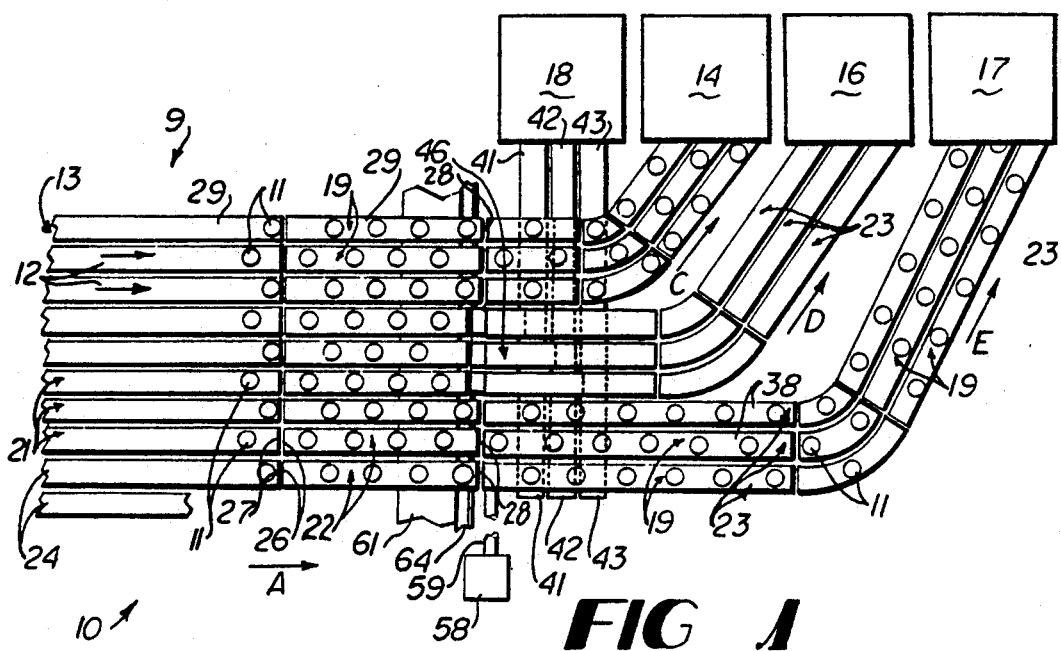
FIG. 1 is a plan view of the cookie conveying system with diverter, illustrating the movement of cookies along an automated baking line toward a series of primary processing stations, showing a line of cookies being diverted to a standby processing station.

Referring now in greater detail to the drawings in which like numerals indicate like parts throughout the several views, FIG. 1 illustrates in schematic form a portion of the cookie conveying system 9 with diverter 10 which receives substantially continuous lines of cookies 11 being transported in series along parallel processing paths 12, in the direction indicated by arrow A, from a cookie oven and a cooling conveyor (not shown). The cookies 11 are deposited onto a series of parallel, spaced apart cookie conveying lines 13 that are in a juxtaposed relationship with one another and function as the primary surface conveying means for carrying the cookies toward a plurality of primary processing stations 14, 16 and 17. A standby processing station 18 is positioned adjacent and to one side of the cookie conveying system with diverter 10.

Typically the cookies 11 will be arranged in rows of a single line of cookies per individual cookie conveying line and the cookies are fed in approximately 20-25 substantially continuous lines 19 through the cookie conveying system 9. The cookies are carried by the individual cookie conveying lines 13 toward the primary processing stations 14, 16 and 17 for processing. It will be understood that although only three primary processing stations 14, 16 and 17 have been shown, approximately seven to ten primary stations generally will be use to receive and process the lines 19 of cookies 11. As shown in the embodiment of the invention illustrated in FIG. 1, three lines 19 of cookies 11 are carried into each primary processing station for processing.

The cookie conveying lines 13 comprise a series of parallel processing conveyors, each of which include receiving conveyors 21 which receive lines of cookies from a cookie oven and a cooling conveyor system (not shown), vertical diverter conveyors 22 and primary processing station conveyors 23. The receiving conveyors 21 are positioned between the cooling conveyor for the lines 19 of cookies 11 and the vertical diverter conveyors 22. The receiving conveyors 21 are surface conveyors, specifically belt conveyors having a substantially continuous moving belt 24 on which the cookies are transported toward the primary processing stations 14, 16 and 17. The receiving conveyors 21 receive the cookies from the cooling conveyor and direct the lines of cookies along the processing paths 12 toward the primary processing stations.

Figure 2:
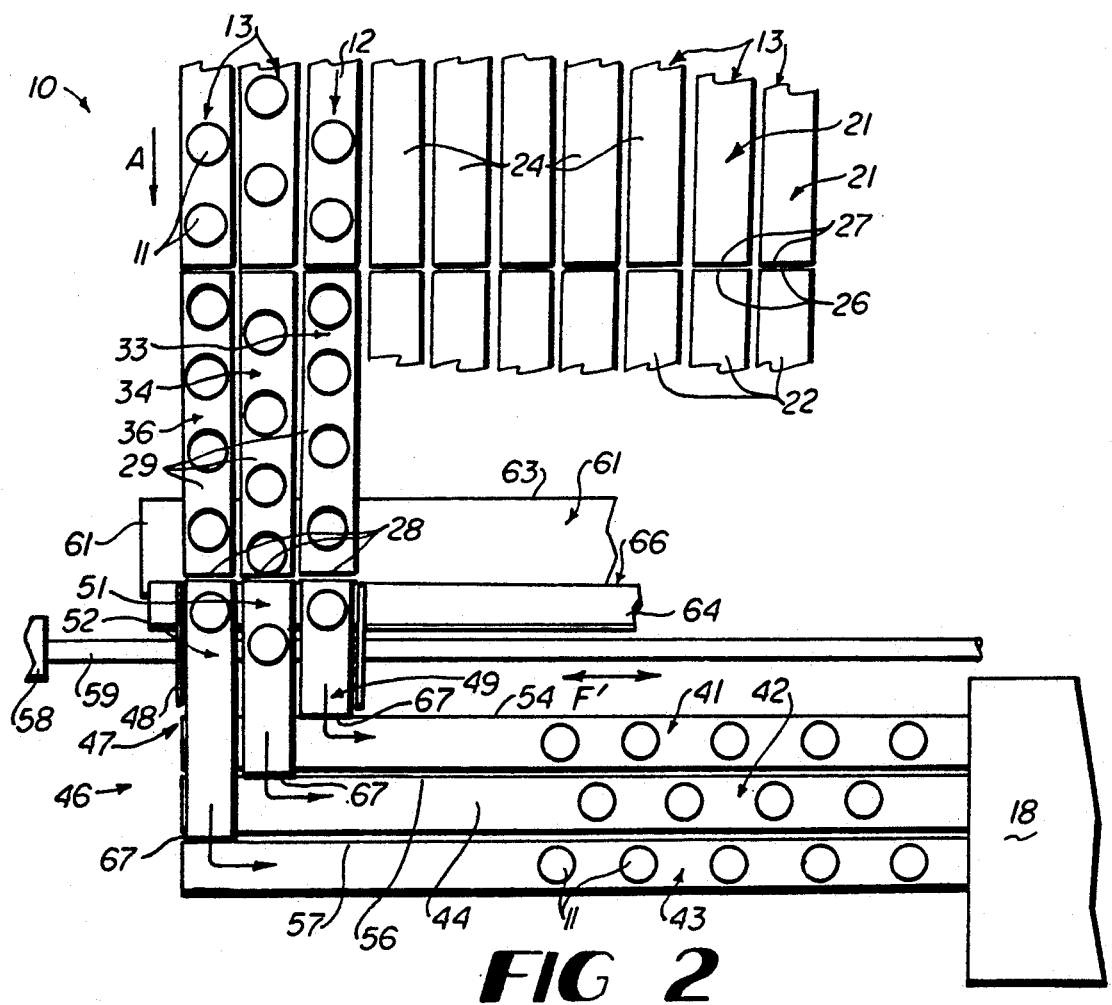
FIG. 2 is a plan view of the cookie conveyor system with diverter, with parts broken away, showing the path of movement of the lines of cookies being diverted toward the standby processing station by the lateral diverter conveyor system with the lateral diverter conveyor system illustrated as a doorstep conveyor system.

As illustrated in FIGS. 1 and 2, each of the vertical diverter conveyors 22 includes a hinged cookie input end 26 aligned with a cookie delivery end 27 of a receiving conveyor 21, and also includes a cookie delivery end 28 at its opposite end. The vertical diverter conveyors 22 are surface conveyors, specifically belt conveyors each having a substantially endless moving belt 29 on which the cookies 11 are transported, arranged in parallel relationship extending along the processing paths 12.

Figure 3:
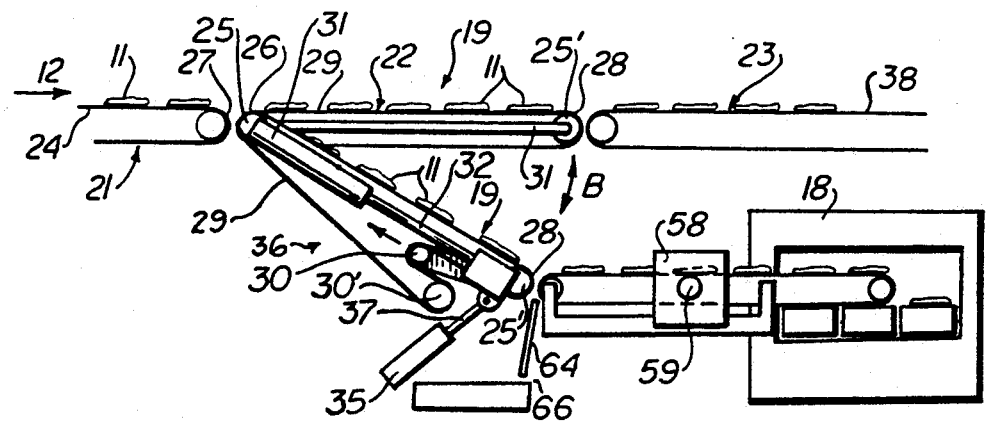
FIG. 3 is a side elevational view of the cookie conveying system with diverter, illustrating the downwardly tilting movement of the vertical diverter conveyors.

As FIG. 3 illustrates, the moving belts 29 of each of the vertical diverter conveyors 22 each extend in a substantially circular path about a pair of conventional rollers 25 and 25' and a pair of take-up rollers 30 and 30'. Rollers 25 are pivotally mounted to an axle (not shown) at the cookie input ends 26 of the vertical diverter conveyors, and rollers 25' are positioned at the cookie delivery ends 28 of the vertical diverter conveyors. The take-up rollers 30 and 30' are mounted below and adjacent the rollers 25', with the take-up rollers 30 fixedly attached to and movable with rollers 25'. The take-up rollers 30 and 30' function as a means for maintaining the tension in the moving belts 29 by being movable away from and toward each other to take-up or provide slack in the moving belts to ensure the continuous operation of the moving belts.

Air cylinders 31 are positioned within the moving belts 29, between the rollers 25 and 25'. The air cylinders 31 are attached to rollers 25, and thus pivot about the axle to which rollers 25 are mounted. As shown in FIG. 3, each of the air cylinders have a retractable piston rod 32 attached to the rollers 25'. The air cylinders longitudinally retract their piston rods 32 approximately three to six inches in order to partially retract or withdraw the rollers 25', and hence the cookie delivery ends 28 of the vertical diverter conveyors rearwardly away from engagement with the primary processing station conveyors 23. As rollers 25' are retracted, take-up rollers 30 are urged rearwardly away from take-up rollers 30', increasing the separation between the take-up rollers by a distance approximately equal to the distance the cookie delivery ends of the vertical diverter conveyors are retracted to thereby take-up any slack in the moving belts 29 created by the retraction of the cookie delivery ends 28 of the vertical diverter conveyors 22.

As shown in FIG. 3, a series of lifter cylinders 35 are mounted below the vertical diverter conveyors 2, and each includes a piston rod 37, which is pivotally attached to a support strut attached to a series of three vertical diverter conveyors adjacent the cookie delivery ends 27 of the three vertical diverter conveyors. The lifter cylinders 35 extend and retract their piston rods 37 causing the vertical diverter conveyors 22 to pivot about rollers 25 such that the cookie delivery ends 28 of each set of three vertical diverter conveyors swing upwardly and downwardly in an arc illustrated by Arrows B. The operation of the lifter cylinders 35 and their piston rods 37 causes the vertical diverter conveyor to pivot downwardly in the direction of Arrows B from their normal operational position aligned with the receiving conveyors 21 and the primary processing station conveyors 23 into a downwardly tilted diverting position. Thus, the vertical diverter conveyors function as a "Trap-Door" mechanism by which a series of three vertical diverter conveyors 33, 34 and 36 (FIG. 2) are pivoted downwardly into their diverting position to divert three lines of cookies 11 away from their diverting position to divert three lines of cookies 11 away from their normal paths of movement along their processing paths 12 and to reroute the cookies along downwardly inclined paths toward the standby processing station 18.

As shown in FIG. 1, the plurality of primary processing conveyors 23 are aligned with the cookie delivery ends 28 of the vertical diverter conveyors 22. Each primary processing station conveyor 23 extends away from the vertical diverter conveyors in the direction of Arrows C, D and E into the primary processing stations 14, 16 and 17. Typically, the primary processing station conveyors 23 will be belt conveyors, similar to the receiving conveyors 21 and the vertical diverter conveyors 22, each having a substantially circular endless moving belt 38 upon which the cookies 11 are transported during the normal operations to the different primary processing stations for processing.

As illustrated by FIG. 2, approximately three standby conveyors 41, 42 and 43 extend laterally beneath the primary processing station conveyors, spanning the width of the 15 to 21 cookie processing lines 13. The standby conveyors 41, 42 and 43 are surface conveyors, specifically belt conveyors, each having an endless moving belt 44 on which a diverted line of cookies 11 is carried into the standby processing station 18 for processing. As FIGS. 1 and 2 illustrate, a lateral diverter conveyor system 46 is positioned beneath both vertical diverter conveyors 22 and the primary processing station conveyors 23. The lateral diverter conveyor system 46 is positioned between the downwardly tilted vertical diverter conveyors 33, 34 and 36 (FIG. 2) and the standby conveyors 41, 42 and 43 and functions as a bridge over which the diverted lines of cookies 37 pass and are deposited on the standby conveyors.

The first embodiment of the invention is for use when the products being carried by the cookie conveying system 9 are cookies that are being transported in a substantially horizontal lying flat "as baked" attitude, spaced apart from one another and resting upon their flat bottom surfaces. In this embodiment the lateral diverter conveyor system 46 is a "doorstep conveyor system" 47. As illustrated in FIG. 2, the doorstep conveyor system 47 includes a carriage 48 which supports a series of three doorstep conveyors 49, 51 and 52. The doorstep conveyors are substantially rectilinear surface conveyors, each having an endless moving belt 53. Each of the doorstep conveyors is directionally aligned with the movement of the diverted lines of cookies 11 on the downwardly tilted vertical diverter conveyors 33, 34 and 36. The doorstep conveyors 49, 51 and 52 each extend from their cookie input ends 54, which are each to be aligned with a cookie delivery end 28 of one of the three downwardly tilted vertical diverter conveyors 33, 34 and 36, toward the standby conveyors 41, 42 and 43.

As illustrated in FIG. 2, the three doorstep conveyors 49, 51 and 52 are of three different lengths. Doorstep conveyor 51 is of a length slightly greater than doorstep conveyor 49 by approximately the width of standby conveyor 41. In turn, doorstep conveyor 52 is of length slightly greater than doorstep conveyor 51 by approximately a distance equal to the width of standby conveyor 42. As FIG. 2 shows, doorstep conveyor 49 extends from the cookie delivery end 28 of downwardly tilted vertical diverter conveyor 33 and terminates above the upstream side edge 54 of the first standby conveyor 41. Doorstep conveyor 51 extends parallel to doorstep conveyor 49, from the cookie delivery end 28 of downwardly tilted vertical diverter conveyor 34 over the first standby conveyor 41 and terminates above the upstream side edge 56 of the second standby conveyor 42. Lastly, doorstep conveyor 52 extends parallel to doorstep conveyors 49 and 51, from the cookie delivery end 28 of downwardly tilted vertical diverter conveyor 36 over the first and second standby conveyors 41 and 42 and terminates above the upstream side edge 57 of the third standby conveyor 43. The doorstep conveyors 49, 51 and 52 receive the diverted lines of cookies from the three downwardly tilted vertical diverter conveyors 33, 34 and 36 and deposit the cookies 11 on the standby conveyors 41, 42 and 43 which transport the cookies in lateral directions into the standby processing station 18.

As illustrated in FIGS. 1, 2 and 3, a drive motor 58 is arranged adjacent and to one side of the diverting cookie conveying system 10. A travel screw 59 extends laterally from the drive motor 58 beneath the 15 to 21 parallel cookie conveying lines 13, spanning the width of the entire cookie processing line and is attached to the carriage 48 of the doorstep conveyor system 47. The drive motor 58 and travel screw 59 function as a means for moving the cookie input ends of each of the doorstep conveyors 49, 51 and 52 into alignment with a cookie delivery end of one of the three downwardly tilted vertical diverter conveyors 33, 34 and 36 as the downwardly tilted vertical diverter conveyors are being tilted downwardly into their cookie diverting position 32. The drive motor 58 is a conventional variable speed reversible motor automatically activated by a signal sent from the computer control system (not shown) for the cookie conveying system 9 (FIG. 1) generated by the downwardly tilting motion of the downwardly tilted vertical diverter conveyors as the lines of cookies are being diverted.

As shown in FIG. 2, one end of the travel screw 59 is engaged by the drive motor 58 such that the activation of the drive motor 58 in turn causes the travel screw 59 to rotate. The travel screw 59 supports the carriage 48 for the doorstep conveyor system 47, which moves laterally along the length of the travel screw 59 as the travel screw 59 is rotated by drive motor 58. The rotation of the travel screw 59 moves the carriage 58 laterally in the direction of Arrows F, carrying the doorstep conveyors 49, 51 and 52 laterally into alignment with the three downwardly tilted vertical diverter conveyors 33, 34 and 36. Thus, the cookie input ends 54 of the doorstep conveyors are simultaneously aligned with the cookie delivery ends 28 of the downwardly tilted vertical diverter conveyors 33, 34 and 36, as the downwardly tilted vertical diverter conveyors are tilted into their diverting position 32.

Additionally, the position of the drive motor 58 to one side of the cookie conveying system with diverter 10 (FIG. 1) itself enables the doorstep conveying system 47 to be moved completely out from beneath the cookie processing lines 13 into a cleaning position. Thus exposed, the doorstep conveyors 49, 51 and 52 can be quickly and easily cleaned when necessary without requiring a worker to crawl under the cookie processing lines in order to clean the carriage and doorstep conveyors of the doorstep conveyor system.

As shown in FIGS. 2 and 3, a scrap conveyor 61 is positioned below the point where the cookie delivery ends 28 of the downwardly tilted vertical diverter conveyors 33, 34 and 36 are aligned with the cookie input ends 54 of the doorstep conveyors 49, 51 and 52. The scrap conveyor is typically a surface conveyor, specifically a belt conveyor having an endless moving belt 63. A baffle or guard strip 64 is mounted above the downstream side edge 66 of the scrap conveyor 61, positioned beneath the cookie input ends 54 of the doorstep conveyors 49, 51 and 52. The baffle strip 64 is preferably a sheet of a soft rubber material and functions to deflect the cookies 11 which fall off the cookie delivery ends 28 of the downwardly tilted vertical diverter conveyors 33, 34 and 36 as they are tilting downwardly into their diverting position 32. The baffle strip 64 deflects the cookies onto the scrap conveyor 61 which carries the cookies away from the diverting cookie conveying system 10.

OPERATION

In the operation of the cookie conveying system 9 (FIG. 1), lines 19 of cookies 11 received on a plurality of separate receiving conveyors 21 and directed along the processing paths 12 toward a series of primary processing stations 14, 16 and 17, such as the cookie loading system disclosed in U.S. Pat. No. 4,712,356. Generally, the cookies 11 are received from the cooling conveyor (not shown) on the receiving conveyors 21, pass over the vertical diverter conveyors 22 and are deposited on the primary processing station conveyors 23 that carry the cookies 11 into the different primary processing stations 14, 16 or 17. The cookies are striped or coated with chocolate, etc. or stacked in product cartons for packaging, as they are passed through the primary processing stations 14, 16 and 17.

However, when one of the primary processing stations 14, 16 or 17 has broken down, a signal is sent to the computer control system (not shown) which controls the cookie conveying system 9 In response to this signal, the computer control system causes the air cylinders 31 (FIG. 3) of the three vertical diverter conveyors 33, 34 and 36 (FIG. 2) of the processing lines 13 for the inoperable processing station partially to withdraw the cookie delivery ends 28 of the vertical diverter conveyors approximately three to six inches, out of engagement with the primary processing station conveyors 23. As illustrated in FIG. 3, as the piston rods 32 are retracted, rollers 25' are pulled rearwardly, and since take-up rollers 30 are attached to rollers 25', take-up rollers 30 are also moved rearwardly, away from take-up rollers 30'. The increased separation between the take-up rollers 30 and 30' takes up the slack created in the moving belts 29 by the retraction of the cookie delivery ends 28 of vertical diverter conveyors 33, 34 and 36. As a result, the tautness of the moving belts is maintained and the moving belts 29 continue to move about the rollers 25, 25', 30 and 30' without interruption.

As the air cylinders 31 are retracting the cookie delivery ends 28 of the three vertical diverter conveyors 33, 34 and 36, a gap of approximately 3 to 6 inches will be formed between the cookie delivery ends 28 of the three vertical diverter conveyors and the standby conveyors 23. Cookies 11 continue to pass over the vertical diverter conveyors and are cycled off of the cookie delivery ends 28, falling through the gap between the vertical diverter conveyors and the primary processing station conveyors. As the cookies fall, they contact the baffle strip 64 (FIG. 2) which deflects the cookies onto the scrap conveyor 61. The scrap conveyor 61 carries the scrap cookies away from the cookie conveying system with diverter 10 and deposits the scrap cookies in a collection bin (not shown). The scrap cookies can then either be fed by hand into a processing station or processed by hand or can be later ground up for use in the next days cookie mix. In any event, these scrap cookies do not have to be wasted.

After the cookie delivery ends 28 of the vertical diverter conveyors 33, 34 and 36 have been retracted, piston rod 37 of the lifter cylinder 35 for that series of three vertical diverter conveyors is retracted by lifter cylinder 35. As piston rod 37 retracts, it causes the cookie delivery ends of vertical diverter conveyors 33, 34 and 36 to swing downwardly in an arc in the direction of Arrows B into their diverging positions.

At the same time the three vertical diverter conveyors are pivoting downwardly, the computer control system (not shown) activates the drive motor 58 (FIG. 2) causing it to engage and rotate the travel screw 59. As the travel screw 59 is rotated by the drive motor 58, the carriage 48 which supports the doorstep conveyors 49, 51 and 52 is moved laterally in the direction of Arrows F. The lateral movement of the doorstep conveyors is halted when the cookie input ends 54 of the doorstep conveyors are aligned with the cookie delivery ends 28 of the three downwardly tilted vertical diverter conveyors, 33, 34 and 36.

Once the doorstep conveyors 49, 51 and 52 are properly aligned, the computer control system sends a signal to again actuate the air cylinders 31 (FIG. 3) to extend their piston rods 32 forwardly to thereby move the cookie delivery ends 28 of the downwardly tilted vertical diverter conveyors 33, 34 and 36 into abutment with the cookie input ends 54 of the doorstep conveyors 49, 51 and 52. At the same time, rollers 25' are moved forwardly by the extension of piston rods 32, pulling take-up rollers 30 toward take-up rollers 30' to thus create slack in the moving belts 29. This stack is simultaneously taken up as rollers 25', and hence the cookie delivery ends 28 of vertical diverter conveyors 33, 34 and 36, are extended forwardly into abutment with the cookie input ends 54 of the doorstep conveyors 49, 51 and 52.

The diverted lines of cookies 11 are passed from the downwardly tilted vertical diverter conveyors onto the doorstep conveyors which deposit the cookies 11 onto the standby conveyors 41, 42 and 43. As the cookies 11 are deposited on the standby conveyors, they are turned at a 90° angle as shown at 67 so as to reorient the cookies 11. The cookies 11 are carried by the standby conveyors 41, 42 and 43 into the standby processing station, where they are striped or coated with chocolate, etc. or are placed in product containers for packaging.

DESCRIPTION OF THE AN ADDITIONAL EMBODIMENT

Figure 4:
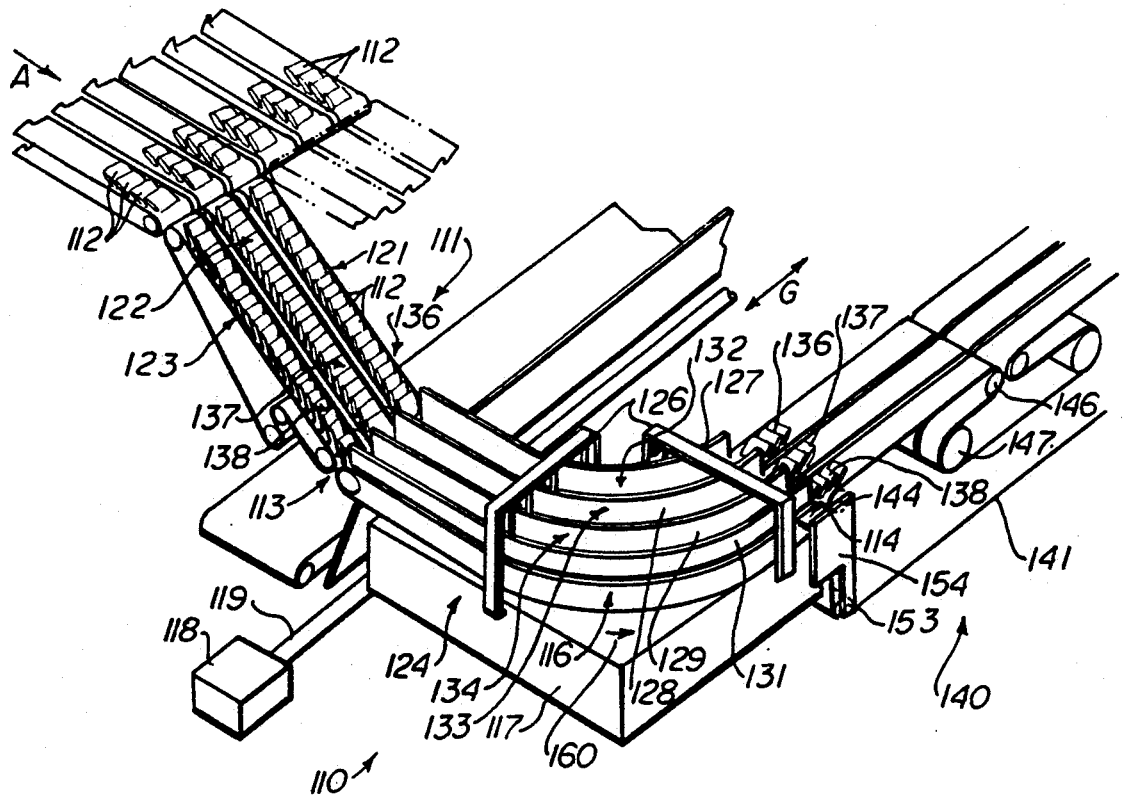
FIG. 4 is a perspective illustration of the operation of the second embodiment of the cookie conveying system with diverter, with the lateral diverter conveyor system illustrated as being a 90° live belt.
Figure 5:
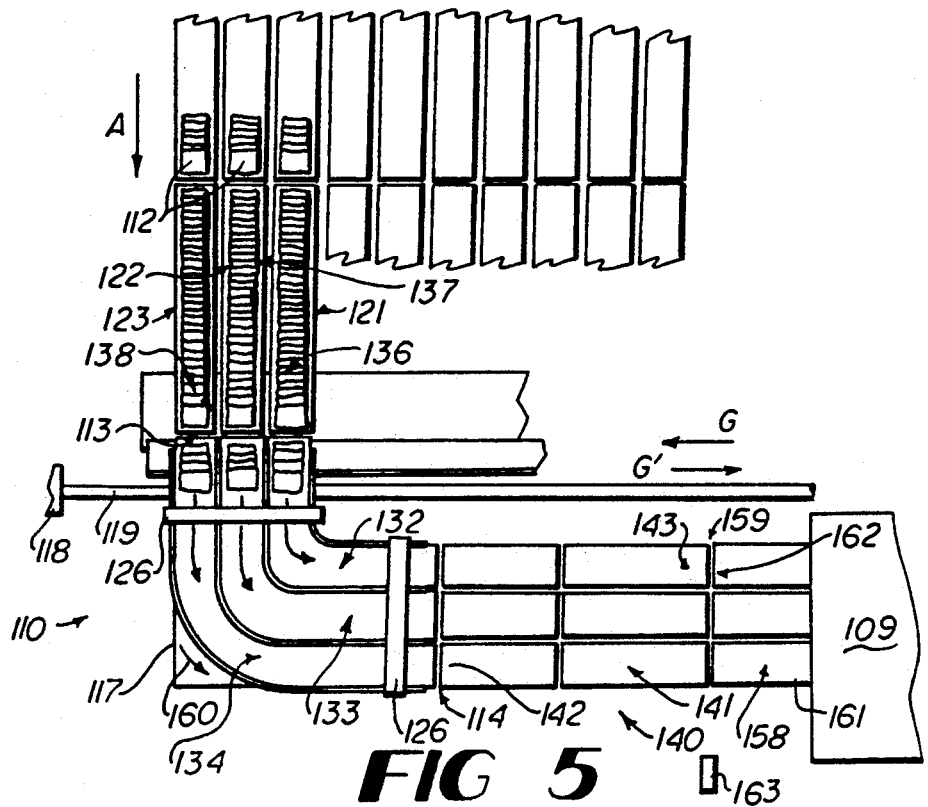
FIG. 5 is a plan view of the second embodiment of the cookie conveying system with diverter, with parts broken away, showing the path of movement of the cookies being diverted toward the standby processing station by the lateral diverter conveyor system, with the lateral diverter conveyor system being illustrated as a 90° live belt.
Figure 6:
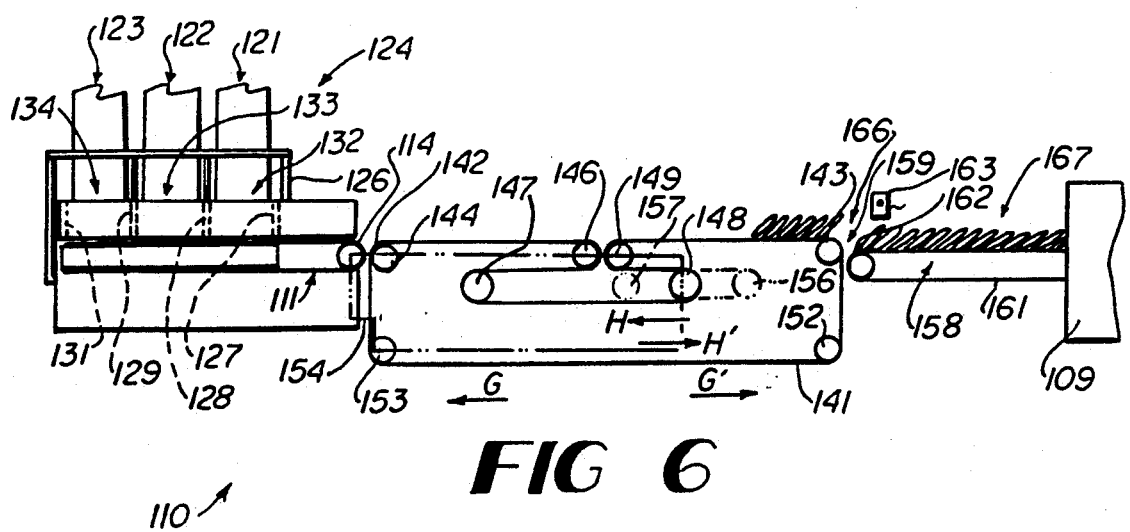
FIG. 6 is a side elevational view of the second embodiment of the cookie conveying system with diverter, schematically illustrating the movement of shingle stacked crackers along the lateral diverter conveyor system and onto the standby conveyors.

When the products being diverted and transported to a standby processing station by the cookie conveying system 9 with diverter 10 are shingle-stacked crackers or cookies, it is generally not practical to use a "doorstep conveyor system", because making an abrupt right angle turn causes the shingle-stacking of the crackers to fall apart. As illustrated in FIGS. 4-6, in an additional embodiment of the invention the lateral diverter conveyor system 110 a 90° "live belt" 111 is that is capable of handling shingle-stacked cookies or crackers 112.

As shown in FIGS. 4 and 5, the live belt 111 is a single, substantially continuous surface conveyor belt that is capable of transporting shingle stacked products along an arcuate path. The live belt 111 includes a cracker input end 113 and a cracker delivery end 114 and has a 90° bend or turn 116 along its length. A substantially rectangular carriage 117 is mounted below the live belt 111 and functions as a support means for the live belt 111.

A variable speed reversible motor 118 is positioned adjacent one side of the cookie conveying system 9 and engages a travel screw 119 which is attached to and supports the carriage 117 of the live belt 111. As the motor 118 is activated, it rotates the travel screw 119 which causes the carriage 117 to move laterally. Thus, the live belt 111 is movable laterally, in the direction of Arrow G in response to the rotation of the travel screw by the drive motor so as to become aligned with a series of three vertical diverter conveyors 121, 122 and 123 that are being tilted downwardly to divert three lines of crackers 112 from their normal path of movement toward a primary processing station.

As FIGS. 5 and 6 illustrate, a "header" 124 is mounted to the carriage 117 and is positioned above the surface of the live belt 111. The header 124 includes a pair of support brackets 126 that are attached to the carriage 117 and extend upwardly and across the surface of the live belt 111. The brackets 126 support a set of four guide rails 127-131 above the surface of live belt 111. The guide rails 127-131 are spaced equidistantly apart from each other across the width of the live belt 111 and are curved so as to follow the contour of the live belt 111. The guide rails 127-131 form three separate channels 132, 133, and 134 on the live belt 111. The crackers 112 move along the channels 132, 133 and 134, as they are carried away from the downwardly tilted vertical diverter conveyors 121, 122 and 123 by the live belt 111. As the crackers are transported by the live belt 111, they engage and slide along the length of the guide rails 127-131 so as to be maintained in separate, spaced apart lines 136, 137 and 138.

As shown in FIGS. 4 and 6, an expansion conveyor system 140 is mounted at the cookie delivery end 114 of the live belt 111, secured to the carriage 117 so as to be movable with the live belt 111. The expansion conveyor system 140 is a belt conveyor having a continuous moving expansion belt 141 that includes a cracker input end 142 and a cracker delivery end 143 (FIG. 6). As shown in FIG. 6, the expansion conveyor system 140 has a series of rollers 144-153 about which the moving belt 141 is moved. A bracket 154 attaches rollers 144, 146, 148, 149, and 153 to the carriage 117 for the live belt 111 so as to maintain the edge-to-edge abutment between the cracker delivery end 114 of the live belt 111 and the cracker input end 142 of the expansion belt 141. Thus, as the live belt 111 is moved laterally, rollers 144, 146, 148, 149, and 153 are moved laterally with the live belt.

Roller 147 remains stationary with respect to roller 148 as rollers 144, 146, 148, 149, and 143 are moved laterally in the direction of Arrows H and H' (FIG. 6). As the live belt 111 moves laterally, pulling or pushing the rollers 144, 146, 148, 149, and 153 with it, roller 148 is moved toward and away from roller 147 each other into positions indicated by dashed lines 156 and 157. The movement of the roller 148 toward and away from roller 147 takes up or provides slack to the expansion belt 141 of the expansion conveyor system 140 as is required by the lateral movement of the live belt 111.

As shown in FIGS. 5 and 6, a standby conveyor 158 is aligned with the cracker delivery end 143 of the expansion belt 141. The standby conveyor 153 extends away from the cracker delivery end of the expansion belt 141 into the standby processing station 109, and is positioned slightly below the cracker delivery end 143 of the expansion conveyor system 140, forming a drop-off point 159. The standby conveyor 158 is typically a surface conveyor, specifically a belt conveyor having a substantially continuous moving belt 161 and having a cracker input end 162 positioned beneath the cracker delivery end 143 of the expansion belt 141 at the drop-off point 159. The standby processing station conveyor 158 receives the lines 136, 137 and 138 of shingle-stacked crackers 112 from the expansion belt 141 and transports the crackers into the standby processing station for processing.

A sensor 163 (FIG. 6) is mounted above the cracker input end 162 of the standby conveyor 158, adjacent the drop off point 159, in a position to read the presence of crackers 112 being fed onto the standby conveyor from the expansion belt 141. As long as the sensor 163 detects the presence of crackers 112, the standby conveyor 158 continues to operate. However, once a gap 166 is detected by the sensor, indicating that lines 136, 137 and 138 of crackers 112 are no longer being diverted toward the standby processing station 109, the sensor sends a signal to the computer control system (not shown) to halt the operation of the standby conveyor 158 with the lines of crackers 112 maintained thereon in substantially forward lying stacks 167.

OPERATION

In operation of the second embodiment of the cookie conveying system with diverter 10 (FIG. 9), the live belt 111 is moved laterally in the direction of Arrows G and G' by the rotation of the travel screw 119, which causes the carriage 117 for the live belt 111 to move laterally, to align the cracker input end 113 of the live belt 111 with the delivery ends of the three vertical diverter conveyors 121, 122 and 123 that are being tilted downwardly to divert the lines of crackers The shingle-stacked crackers 112 pass onto the live belt 111 and are moved along the separate channels 132, 133 and 134, along an arcuate path 168. The lines of crackers 112 are turned 90° as they are carried along the path 168 by the live belt and are directed toward the standby processing station 109.

As the live belt 111 moves laterally into alignment with the three downwardly tilting vertical diverter conveyors, rollers 144, 146, 148, 149, and 153 of the expansion conveyor system 140 are carried with the live belt by the movement of carriage 117. When the live belt moves in the direction of Arrow G, rollers 144, 146, 149, and 153 are pulled away from rollers 151 and 152 and roller 148 is moved toward roller 147, in the direction of Arrow H into its position shown at 156 to create more slack in the expansion belt 141. When the live belt moves in the direction of Arrow G', rollers 144, 146, 149, and 153 are urged toward rollers 151 and 152 and roller 148 is moved away from roller 147 in the direction of Arrow H, into its position shown at 157, to take up the slack created in the expansion belt 141 as rollers 144, 146, 149, and 153 move toward rollers 151 and 152 to maintain the tautness of the expansion belt.

The crackers 112, maintained in their shingle-stacked orientation, pass over the expansion belt 141 and are deposited on the standby conveyor 158 at the drop-off point 159. The foremost crackers 169 of the lines 136, 137 and 138 of crackers on the expansion belt 141 are deposited on the rearmost cracker 171 of the forward lying stacks 167 of crackers on the standby conveyor 158, filling the gap 166. The sensor 158 detects the presence of additional crackers, indicating additional lines of crackers are being diverted toward the standby processing station, and sends a signal to the computer control system to restart the standby conveyor 158. In response to the signal, the standby conveyor 158 resumes its operation of transporting the diverted crackers to the standby processing station 109. The crackers 112 are gradually raised to a substantially vertical edge-standing attitude by the standby conveyor 158 as the crackers are carried toward the standby processing station so that the crackers are in an edge-standing attitude as they enter the standby processing station for processing.

While the invention has been disclosed in connection with the transport of cookies and shingle-stacked crackers along automated processing lines, it should be apparent to those skilled in the art that the principles of this invention could be utilized in other environments for transporting and diverting a variety of objects from their primary processing paths, and the terms "cookies" and "crackers" are not to be construed as limiting this invention solely to the transport of cookies and crackers along a processing path.

Further, it will be understood that the foregoing relates only to preferred embodiments of the present invention, and numerous changes and modifications can be made thereto without departing from the spirit and scope of the invention as set forth in the following claims.

We claim:

1. Apparatus for diverting lines of cookies from paths moving toward a primary processing station to paths moving toward a standby processing station, comprising:

a plurality of vertical diverter conveyors, each of said vertical diverter conveyors constructed and arranged for carrying at least one row of cookies toward a primary processing station;

a plurality of primary processing station conveyors, each aligned with a separate one of said vertical diverter conveyors for delivering the rows of cookies from vertical diverter conveyors to the primary processing stations;

a lateral diverter conveyor system positioned adjacent said vertical diverter conveyors and including a cookie input end and a cookie discharge end for receiving a plurality of lines of cookies from said vertical diverter conveyors and advancing the lines of cookies to the standby processing station when the primary processing station for the lines of cookies is inoperable;

means for tilting each of said vertical diverter conveyors toward said lateral diverter conveyor system when one of the primary processing stations for the cookies is inoperable;

control means for moving said lateral diverter conveyor system laterally into alignment with said vertical diverter conveyors when said vertical diverter conveyors are tilted toward said lateral diverter conveyor system;

whereby when one of the primary processing stations becomes inoperable, said vertical diverter conveyors which are transporting lines of cookies toward the inoperable primary processing station are tilted and said lateral diverter conveyor system is moved laterally by the control means into alignment with said tilted vertical diverter conveyors, and the lines of cookies on said tilted vertical diverter conveyors are diverted away from the inoperable primary processing station and are advanced to the standby processing station.

2. The apparatus of claim 1 and further including a plurality of standby conveyors each aligned with said cookie discharge end of said lateral diverter conveyor system and extending from a position partially beneath said cookie discharge end of said lateral diverter conveyor system toward the standby processing station, for receiving diverted cookies from said lateral diverter conveyor system and transporting the diverted cookies through the standby processing station.

3. The apparatus of claim 1 and further including a scrap conveyor positioned below said cookie input end of said lateral diverter conveyor system for catching cookies which have fallen off of said vertical diverter conveyors as said vertical diverter conveyors are being tilted downwardly into alignment with said surface conveyor means.

4. The apparatus of claim 2 and wherein said lateral diverter conveyor system comprises a doorstep conveyor system having a plurality of rectilinear conveyors each alignable with one of said downwardly tilted vertical diverter conveyors and extending toward said standby processing conveyors along a path substantially parallel to the direction of movement of the lines of cookies.

5. The apparatus of claim and wherein said lateral diverter conveyor system comprises a surface conveyor that extends away from the said downwardly tilted vertical diverter conveyor through an approximately 90° turn and toward the standby processing station.

6. Apparatus for diverting rows of cookies being carried on automated cookie processing lines toward a plurality of primary processing stations, to a standby processing station comprising:

a primary surface conveying means including a plurality of vertical diverter conveyors each including a cookie input end and a cookie delivery end for transporting lines of cookies to a plurality of primary processing stations, said vertical diverter conveyors being pivotable downwardly and away from the normal path of movement of the cookies toward the primary processing station, for diverting some of the rows of cookies from a primary processing station which has become inoperable toward a standby processing station;

a lateral diverter conveyor system including a plurality of cookie conveying means each including a cookie input end and a cookie discharge end, with the cookie input end of each cookie conveying means being movable into alignment with a cookie delivery end of one of said vertical diverter conveyors for receiving and diverting rows of cookies from said primary surface conveying means and delivering the rows of cookies to the standby processing station; and means for moving said lateral diverter conveyor system into alignment with the cookie delivery ends of said vertical diverter conveyors when said vertical diverter conveyors are moved to a downwardly tilted cookie diverting position for diverting the rows of cookies from their paths of movement to a primary processing station and toward a standby processing station.

7. The apparatus of claim 6 and further including a plurality of standby conveyors positioned in alignment with said cookie delivery end of said lateral diverter conveyor system for receiving cookies from said lateral diverter conveyor system and transporting the cookies through the standby processing station.

8. The apparatus of claim 6 and wherein said means for moving said lateral diverter conveyor system into alignment with said delivery end of said vertical diverter conveyors comprises:
- a drive motor positioned adjacent and to one side of said lateral diverter conveyor system;
- a travel screw mounted in driven relationship to said drive motor and rotated by said drive motor; and
- a carriage mounted on said travel screw for supporting said lateral diverter conveyor system;
- whereby as said drive motor is actuated by the downwardly tilting motion of said vertical diverter conveyors, said drive motor rotates said travel screw to thus cause said carriage to be moved laterally so as to align said cookie input ends of said standby conveyors with said cookie delivery ends of said primary vertical diverter conveyors when said vertical diverter conveyors are in their downwardly tilted diverting position.

9. The apparatus of claim 7 and wherein said lateral diverter conveyor system comprises a live surface conveyor belt extending about an arcuate path from a position adjacent said cookie delivery end of said vertical diverter conveyors to a position longitudinally aligned with said standby conveyors.

10. The apparatus of claim 7 and wherein said lateral diverter conveyor system comprises a plurality of substantially rectilinear surface conveyor belts longitudinally aligned with said downwardly tilted vertical diverter conveyors and extending from said cookie delivery end of said vertical diverter conveyors normal to said standby conveyors, and intersecting with said standby conveyors such that as the cookies pass from said surface conveyor belts, the cookies are turned at right angles to their paths of movement on said rectilinear surface conveyor belts.

11. A method of diverting lines of cookies being transported on automated processing lines to a plurality of primary processing stations to a standby processing station, when one of the primary processing stations has become inoperable, comprising the steps of:
- tilting a plurality of vertical diverter conveyors carrying the lines of cookies toward the inoperable processing station;
- moving a lateral diverter conveyor system laterally into alignment with the delivery end of the tilted vertical diverter conveyors;
- passing the lines of cookies from the tilted vertical diverter conveyors onto the lateral diverter conveyor system;
- transferring the lines of cookies from the lateral diverter conveyor system to a plurality of standby processing conveyors; and
- carrying the diverted lines of cookies into the standby processing station.

12. The method of claim 11 and further including the step of partially withdrawing the vertical diverter conveyors from engagement with a primary processing station conveyor for the inoperable primary processing station, prior to tilting the vertical diverter conveyors.

13. The method of claim 11 and wherein moving the lateral diverter conveyor system comprises actuating a drive motor, rotating a travel screw attached to the lower surface of the lateral diverter conveyor system by the actuation of the drive motor, and as the travel screw rotates, carrying the lateral diverter conveyor system laterally to align the lateral diverter conveyor system with the cookie delivery ends of the downwardly tilted vertical diverter conveyors line.

* * * * *